US009575180B2

United States Patent
Miller et al.

(10) Patent No.: US 9,575,180 B2
(45) Date of Patent: Feb. 21, 2017

(54) ROOM OCCUPANCY SENSING APPARATUS AND METHOD

(71) Applicant: MBDA UK Limited, Stevenage, Hertfordshire (GB)

(72) Inventors: Lee Douglas Miller, Bristol (GB); Karen Louise McKee, Bristol (GB)

(73) Assignee: MBDA UK LIMITED, Hertfordshire (GB)

( * ) Notice: Subject to any disclaimer, the term of this patent is extended or adjusted under 35 U.S.C. 154(b) by 35 days.

(21) Appl. No.: 14/428,175

(22) PCT Filed: Sep. 12, 2013

(86) PCT No.: PCT/GB2013/052379
§ 371 (c)(1),
(2) Date: Mar. 13, 2015

(87) PCT Pub. No.: WO2014/041350
PCT Pub. Date: Mar. 20, 2014

(65) Prior Publication Data
US 2015/0234048 A1    Aug. 20, 2015

(30) Foreign Application Priority Data

Sep. 13, 2012 (EP) ................................. 12275141
Sep. 13, 2012 (GB) ................................. 1216330.9

(51) Int. Cl.
*G08B 13/18* (2006.01)
*G01S 17/02* (2006.01)
(Continued)

(52) U.S. Cl.
CPC .............. *G01S 17/026* (2013.01); *G01S 7/484* (2013.01); *G08B 13/122* (2013.01); *G08B 13/124* (2013.01)

(58) Field of Classification Search
CPC ...... G08B 13/19; G08B 13/124; G08B 13/122; G08B 21/0469; G01S 15/025; G01S 17/026; G01S 17/66; G01S 17/93; G01S 7/484; G01N 21/00; G01N 21/47; G01N 21/35; G01N 21/81
(Continued)

(56) References Cited

U.S. PATENT DOCUMENTS 4,319,332 A    3/1982  Mehnert
4,551,711 A *  11/1985 Akiyama .............. G08B 13/19
                                                    250/342
(Continued)

FOREIGN PATENT DOCUMENTS

DE    19947023 A1    5/2001
EP    0341022 A2    11/1989
(Continued)

OTHER PUBLICATIONS

International Preliminary Report on Patentability together with the Written Opinion dated Mar. 26, 2015, from related International Application No. PCT/GB2013/052379.
(Continued)

*Primary Examiner* — Hoi Lau
(74) *Attorney, Agent, or Firm* — Scully, Scott, Murphy & Presser, P.C.

(57) ABSTRACT

A building comprising a plurality of rooms (10) includes a room occupancy sensing apparatus. A light source (20) emits a series of light pulses (22), a plurality of waveguides deliver light from the light source to output nodes (60) located in the rooms, and a signal capture unit (30) receives output signals resulting from light reflected by objects in the rooms. The apparatus detects movement, of for example a person (40), in a room and ascertains the room concerned by virtue of (i) detecting a difference between the shape of the waveform of
(Continued)

the signal (24 i) received at the signal capture unit (30) in response to a first emitted light pulse and the shape of the waveform of the signal (24m) received at the signal capture unit in response to a second emitted light pulse and (ii) relating said reflected light pulses to the appropriate output node and therefore to the room (10) associated with that output node (60).

20 Claims, 6 Drawing Sheets

(51) Int. Cl.
*G01S 7/484* (2006.01)
*G08B 13/12* (2006.01)

(58) Field of Classification Search
USPC 340/521, 556, 541, 555, 557, 564; 250/342, 205, 221, 353, 208.1; 342/104; 356/73.1, 5.01, 338, 614, 445, 446, 450
See application file for complete search history.

(56) References Cited

U.S. PATENT DOCUMENTS

| | | | | |
|---|---|---|---|---|
| 4,612,442 A * | 9/1986 | Toshimichi | G01S 15/025 | 250/342 |
| 4,736,097 A * | 4/1988 | Philipp | G01V 8/20 | 250/205 |
| 4,760,381 A | 7/1988 | Haag | | |
| 4,797,547 A | 1/1989 | Blanc et al. | | |
| 5,428,345 A * | 6/1995 | Bruno | G08B 25/008 | 340/521 |
| 5,640,143 A * | 6/1997 | Myron | G08B 29/185 | 250/DIG. 1 |
| 5,963,000 A * | 10/1999 | Tsutsumi | E05F 15/73 | 250/221 |
| 6,097,329 A * | 8/2000 | Wakayama | G01S 13/22 | 342/104 |
| 6,188,319 B1 | 2/2001 | Frucht | | |
| 6,211,522 B1 * | 4/2001 | Kotlicki | G02B 3/005 | 250/353 |
| 6,211,787 B1 * | 4/2001 | Yoshiike | G08B 21/0469 | 250/342 |
| 6,255,946 B1 * | 7/2001 | Kim | G08B 13/184 | 250/221 |
| 6,759,954 B1 * | 7/2004 | Myron | H05B 37/0227 | 315/294 |
| 6,980,108 B1 * | 12/2005 | Gebbia | G08B 13/124 | 340/541 |
| 7,233,243 B2 * | 6/2007 | Roche | G08B 13/1618 | 340/540 |
| 7,411,195 B2 * | 8/2008 | Narasako | G01S 17/023 | 250/338.3 |
| 2001/0040514 A1 * | 11/2001 | Horber | G01S 7/4802 | 340/933 |
| 2002/0135749 A1 * | 9/2002 | Maimon | G01S 7/497 | 356/4.07 |
| 2007/0008123 A1 * | 1/2007 | Swanson | G08B 13/122 | 340/541 |
| 2007/0030115 A1 * | 2/2007 | Itsuji | A61B 5/0507 | 340/5.8 |
| 2007/0070358 A1 * | 3/2007 | Ouchi | G01S 17/875 | 356/614 |
| 2008/0042824 A1 * | 2/2008 | Kates | G08B 13/183 | 340/522 |
| 2008/0079569 A1 * | 4/2008 | Axelsen | G06Q 10/10 | 340/541 |
| 2008/0186475 A1 * | 8/2008 | Kawata | G01B 11/026 | 356/73 |
| 2008/0239325 A1 * | 10/2008 | Cheng | G01S 17/026 | 356/614 |
| 2009/0002644 A1 * | 1/2009 | Christensen | F16P 3/14 | 353/85 |
| 2009/0086189 A1 * | 4/2009 | Drinkard | G01S 7/4812 | 356/5.01 |
| 2009/0210193 A1 * | 8/2009 | Nagase | F24F 11/0034 | 702/152 |
| 2009/0262098 A1 * | 10/2009 | Yamada | G06F 1/1616 | 345/175 |
| 2009/0262760 A1 * | 10/2009 | Krupkin | G01S 7/414 | 372/6 |
| 2010/0053330 A1 * | 3/2010 | Hellickson | G01S 17/023 | 348/153 |
| 2010/0070988 A1 * | 3/2010 | Cohen | G06K 9/00604 | 725/10 |
| 2010/0077421 A1 * | 3/2010 | Cohen | G07C 9/00158 | 725/10 |
| 2010/0102962 A1 * | 4/2010 | Hick | H05B 37/0227 | 340/541 |
| 2010/0271622 A1 * | 10/2010 | Hori | G01M 11/3145 | 356/73.1 |
| 2010/0277713 A1 * | 11/2010 | Mimeault | G01S 7/487 | 356/5.01 |
| 2010/0281432 A1 * | 11/2010 | Geisner | G06F 3/011 | 715/849 |
| 2011/0058167 A1 * | 3/2011 | Knox | G01N 15/06 | 356/338 |
| 2011/0102776 A1 * | 5/2011 | Hasegawa | G01M 11/3145 | 356/124.5 |
| 2011/0158481 A1 * | 6/2011 | Chang | G01S 17/08 | 382/106 |
| 2011/0176709 A1 * | 7/2011 | Park | G06T 7/0057 | 382/106 |
| 2011/0181892 A1 * | 7/2011 | Ritter | G01J 1/46 | 356/614 |
| 2012/0066168 A1 * | 3/2012 | Fadell | H05B 37/0227 | 706/52 |
| 2012/0070152 A1 * | 3/2012 | Preston | F41A 33/02 | 398/115 |
| 2012/0147705 A1 * | 6/2012 | Hick | G01S 15/04 | 367/93 |
| 2012/0161645 A1 * | 6/2012 | Dingemans | H05B 37/0218 | 315/153 |
| 2012/0201424 A1 * | 8/2012 | Masalkar | A63F 13/06 | 382/106 |
| 2012/0274922 A1 * | 11/2012 | Hodge | F41J 5/02 | 356/28 |
| 2012/0287417 A1 * | 11/2012 | Mimeault | G01C 3/08 | 356/5.01 |
| 2013/0069543 A1 * | 3/2013 | Mohan | G08B 17/12 | 315/155 |
| 2013/0070258 A1 * | 3/2013 | Morbee | G01V 8/20 | 356/614 |
| 2013/0300840 A1 * | 11/2013 | Borowski | G01S 7/483 | 348/50 |
| 2015/0234048 A1 * | 8/2015 | Miller | G01S 7/484 | 356/445 |
| 2015/0362585 A1 * | 12/2015 | Ghosh | G01S 7/4815 | 250/208.1 |
| 2016/0011053 A1 * | 1/2016 | Katz | G01J 5/34 | 250/338.3 |

FOREIGN PATENT DOCUMENTS

| | | |
|---|---|---|
| EP | 2053424 A1 | 4/2009 |
| EP | 2053427 A1 | 4/2009 |
| GB | 2128836 A | 5/1984 |
| GB | 2361058 A | 10/2001 |
| GB | 2384126 A | 7/2003 |
| WO | WO 2005/031385 A1 | 4/2005 |

OTHER PUBLICATIONS

International Search Report dated Jan. 14, 2014 issued in PCT/GB2013/052379.

(56) References Cited

OTHER PUBLICATIONS

Extended European Search Report dated Feb. 4, 2013 issued in EP 12275141.5.
UK Search Report dated Nov. 7, 2012 issued in GB 1216330.9.

* cited by examiner

ROOM OCCUPANCY SENSING APPARATUS AND METHOD

BACKGROUND OF THE INVENTION

The present invention concerns a room occupancy sensing apparatus. More particularly, but not exclusively, this invention concerns a building comprising a plurality of rooms and a room occupancy sensing apparatus, and a corresponding method for sensing room occupancy.

In various applications there is a desire to be able to detect which, if any, of a plurality of rooms are occupied. For example, such a function may be of particular use in quickly assessing which of many rooms in a building are occupied in the case of an emergency, such as a fire, or in detecting a burglar or other intruder or unauthorised person. Room occupancy sensing systems of the prior art are typically based on passive infrared sensors, which detect relatively large movements, and therefore occupancy, by means of monitoring a change in infra-red radiation from a moving heat source; however, such systems are not sufficiently sensitive for use in some applications: a relatively high background temperature in a room can adversely affect accuracy for example. For more sensitive applications, active sensor systems may be more appropriate. One such active sensor system uses radio frequency (RF) radiation and works by creating a field of radio wave radiation with one or more RF emitters and detecting changes in that field via one or more RF detectors. Such changes are caused by movement, which suggests occupancy in the associated room. The wavelength and power of such RF radiation can be chosen to suit the application, and can be chosen such that movement can be detected through walls in a building. The sensitivity and range of motion detection in such RF-based systems can be difficult to get right, however: increasing sensitivity can have the effect that motion in an adjacent room is detected through a wall, leading to false positive detections being made (e.g. suggesting incorrectly that there is motion within a room based on detecting motion in an adjacent room through a partition wall), whereas reducing sensitivity to the level where false positives are reduced to a reasonable level can risk rendering the motion detection system insufficiently sensitive to detect room occupancy reliably.

US2010/0053330 (Hellickson et al) describes a LADAR based security sensor system that operates by comparing a 3D LADAR image of a scene with a 3D template of the scene. When an intruder enters the scene the microprocessor detects a difference between the LADAR sensor output and the 3D template. Calibration of the system of US2010/0053330 is required, which accounts for the fixed objects within the scene, so as to create the pre-determined spatial reference template against which the spatial image information is compared. If any objects are moved (e.g., a chair when someone moves to a new location), the system needs to be recalibrated in order to avoid a false alarm. US2010/0053330 is a relatively complicated spatial imaging system for monitoring a single scene, for example a single room. Monitoring of multiple rooms would appear to require multiple systems. The methodology of US2010/0053330 relies on capturing a spatial image of a room, namely a 3-D image comprising multiple pixels. The system of US2010/0053330 relies on the detection of spatial information concerning the scene being monitored; this results in a system that would be relatively complicated and expensive for a room occupancy sensing system.

GB2128836 (Zellweger Uster AG) concerns monitoring discrete surfaces, particularly door or window openings of a building, against unauthorised intrusion. Directional radiation is emitted in pulses from a plurality of pulse transmitters, the transmitters being operated in a defined time sequence. Each transmitter emits several discrete beams at the same time in different directions, each beam travelling a different distance before being reflected by a surface and detected at a corresponding receiver. The transit times of the transmitted pulse for each of the beams from a single transmitter are representative of distance vectors. A change of any of the distance vectors is interpreted as an object penetrating into the space being monitored and interrupting the beam. In such a case, an alarm is triggered. The system of GB2128836 is able to determine the location of the object by means of ascertaining which distance vector has changed. Essentially, GB2128836 is performing a laser range-finding method with each beam emitted from each transmitter. The system relies on time-of-arrival information on a per beam basis. If it were the case that an object entered a room in a way that caused the times of arrival of two beams to switch (so that before the object enters the room, beam B1 has a time of arrival of T1 and beam B2 has a time of arrival of T2, whereas immediately after the object enters the room, beam B1 has a time of arrival of T2 and beam B2 has a time of arrival of T1) the apparatus would fail to detect the presence of the object. It therefore seems that the sensitivity of the method of GB2128836 could be improved. U.S. Pat. No. 4,319,332 also discloses a system similar to that of GB2128836.

GB2361058 (British Telecommunications plc) relates to an optical intruder detection system which utilises single-photon detection technology. Short multi-photon pulses of laser light are directed at a scattering target which scatters each pulse in all directions. The scattering target scatters photons throughout the room in all directions. Optical input ports are positioned in the room in various locations. Optical fibres of different lengths (introducing different respective optical delays) connect the input ports to a highly sensitive light detector in the form of a single-photon detector. In use, photons are reflected and received by respective input ports at different times (as a result of the optical delays introduced by the optical fibres) and then detected by the single-photon detector. In the steady state, a room in which there is no movement, will generate a photon-count rate at a certain level for each input port. A computer compares the measured count rates with predetermined upper and lower threshold values. When an intruder enters the room, and for example reduces the level of light reaching one or more of the input ports, the count rate will fall below the minimum expected threshold value. An intruder alarm is then triggered. The use of single-photon detection technology might at first be viewed as providing the system with excellent sensitivity; however, it is thought that the proposal's reliance on such detectors introduces several disadvantages. It would seem that the laser intensity would need to be finely adjusted so that each sensing node sends no more than a single photon to the detector at a time. This is because single photon detectors typically are unable to distinguish between a count event triggered by one photon and a count event triggered by many photons.

The prior art proposals known to the inventors tend to fall into one of two categories. There is either measurement and comparison of intensity/power (as in GB2361058 for example) and not range/time, or there is measurement and comparison of range/time (as in GB2128836 for example) and not intensity/power.

The present invention seeks to mitigate one or more of the above-mentioned problems. Alternatively or additionally, the present invention seeks to provide an improved room occupancy system, preferably one which provides improved sensitivity to small movements of, or caused by, an occupant in the room.

SUMMARY OF THE INVENTION

The present invention provides, according to a first aspect, a room occupancy sensing apparatus comprising at least one light source arranged to emit a series of light pulses, a plurality of waveguides, at least some of the waveguides being arranged to deliver light from the light source to one or more output nodes located in one or more rooms in a building, at least one signal capture unit for receiving output signals resulting from light reflected by objects in the or each room being monitored, and a signal processor. The invention has particular, but not exclusive, application in relation to monitoring occupation of a building comprising a plurality of rooms. The apparatus is advantageously arranged so as to be able to distinguish between a light pulse reflected by an object in a room delivered to that room via any one output node from a reflected light pulse originating from an output node in any different room (and preferably from any other output node). The apparatus is so arranged that, in use, the signal processor compares the signal received at the signal capture unit in response to a first emitted light pulse with the signal received at the signal capture unit in response to a second emitted light pulse. Advantageously, it is the shape of the waveform of the signal that is compared. Embodiments of the apparatus of the invention are thus advantageously able to detect movement in a room by virtue of detecting a difference between signals, preferably by comparing the shapes of the waveforms of the signals, received by the signal capture unit resulting from reflected light pulses from such first and second emitted light pulses. Embodiments of the apparatus of the invention are able to ascertain the particular room in which detected movement has occurred by virtue of relating said reflected light pulses to the room concerned (for example by relating said reflected light pulses to the appropriate output node and therefore to the room associated with that output node).

Using a light source in the manner described herein may allow the occupancy of a room to be ascertained whilst reducing significantly the risk of false positives from movement in a region outside of the room, because room layouts are often such that light is substantially prevented from transmitting from one room to another. Rooms are typically separated by partitions walls that do not transmit light. Even where rooms are separated by partitions that transmit some wavelengths of light, the light may be selected to be of an operating wavelength that is not transmitted by the partition (for example, in the case of a glass partition, the wavelength may be an appropriate infrared wavelength). Also, using light as the source of radiation may facilitate the use of fewer sources of radiation for the system, as it is possible to use one source for many rooms, with appropriate optics and/or controls in place to allow the apparatus to distinguish between a reflected light pulse originating from one output node and a reflected light pulse originating from another output node.

The ability to detect a difference between signals received by the signal capture unit resulting from reflected light pulses from respective first and second emitted light pulses, such a difference for example being caused by movement or introduction of an object into the room, may be achieved by means of the apparatus comparing temporal differences between the respective pulses. For example, the shapes of the waveforms of the reflected light pulses may differ as a result of at least some of the light being reflected differently, as between the first and second pulse, and therefore travelling over paths of different lengths and therefore resulting in temporal differences in the waveforms of the reflected light signals. It is not essential for a room occupation system of the type provided by embodiments of the present invention to have the ability to detect spatial image information concerning the scene in each room being monitored. Using temporal differences between the waveforms of pulses, particularly differences in the shapes of the waveforms (of for example the waveform of the variation of the intensity of the signal as measured over time) of the signals, to detect a change in the scene being monitored (e.g. movement of an object in a room) provides a simple and elegant solution to detecting room occupation. For example, having a room occupancy sensing apparatus which operates by means of using the way in which the waveforms of reflected light pulses vary with time, does not require the use of a large array of image pixels, or the detection or reconstruction of spatial image data.

Embodiments in which it is the shapes of the waveforms that are compared may advantageously be able to provide greater sensitivity of detection of movement in the room and/or greater sensitivity of detection of a change in the environment in the room. Information concerning the type of movement and/or change in the environment in the room may be extracted by analysing how the shape of the waveform has changed. The analysis of how the shape of the waveform has changed may include using the differences in waveform shape to extract range-finding information. As mentioned above, prior art proposals tend to rely either on measuring intensity/power or on measuring range/time; in contrast to such proposals, embodiments of the present invention in which the shapes of the signal waveform are compared may have advantages of both such approaches (in that both intensity/power and range/time are effectively measured and compared when detecting differences in the intensity vs. time waveshape).

It may be that the light is of an intensity and/or an operating wavelength selected to provide a signal-to-noise ratio sufficient to distinguish the pulses from ambient light sources. The apparatus may include a filter to attenuate incoming light of wavelengths other than the operating wavelength.

It will be appreciated that the present invention, in utilising a controlled light source for detection of movement, is an active system, not a passive system in which detectors utilise ambient light or infra-red radiation from warm bodies in a scene.

The present invention has particular application in relation to detecting room occupancy, for example for ensuring fire-risk safety and/or intruder detection, in large buildings with many rooms (ten or more). The building may have more than five rooms, and may have more than ten rooms. Preferably, more than five rooms (and possibly more than ten rooms) are monitored with the room occupancy sensing apparatus. Preferably, substantially all rooms in the building that are designed for human occupation are associated with at least one output node, and each output node is only associated with one room.

Optionally, the rooms in which one or more of the output nodes are located may include at least one communal area, for example an open plan area, corridor, kitchen or lavatory area. The term "room" will be understood to cover within its scope such areas within building. The invention may thus have application into monitoring occupancy in any part of a building.

As mentioned above, the apparatus is so arranged that, in use, the signal processor compares the signal received at the signal capture unit in response to a first emitted light pulse with the signal received at the signal capture unit in response to a second emitted light pulse, preferably by comparing the shapes of the waveforms of the signals. It will of course be appreciated that the words "first" and "second" are used in this context as convenient labels to distinguish between the two emitted light pulses concerned. There may for example be other emitted light pulses that are received between the "first" and "second" light pulses. It is however preferred that the time between the first and second light pulses is less than 5 seconds, thus ensuring that the occupancy of a room is checked at least once every 5 seconds. Having a relatively short time between the first pulse and the second pulse effectively means that the occupancy or otherwise of a room is compared against a very recently generated reference (the first pulse for example being the reference for an unoccupied state of the room, against which the second pulse is effectively compared). Thus, movement of objects (for example, the position of a chair) within the room, when occupied, are accounted for, without any need for recalibration of the apparatus, when the room becomes unoccupied again. The first pulse may be used as a reference pulse, and used for comparison with second, third, and successive pulses. The apparatus may use a different pulse as the "first pulse" against which a subsequent pulse is effectively compared, at least once every minute. The time between the first and second light pulses may be more than 1 ms. The room occupancy sensing apparatus may include an electronic data storage unit having a memory in which data concerning the shape of a multiplicity of detected waveforms may be stored. The signal processor may be arranged to compare the shape of the waveform of the signal received at the signal capture unit in response to a subsequent emitted light pulse with the shape of a waveform stored in memory. The signal processor may be arranged to compare the shape of the waveform of the signal received at the signal capture unit in response to a subsequent emitted light pulse with the shapes of a plurality of waveforms stored in memory. The shapes of the plurality of waveforms stored in memory may relate to the signals received at the signal capture unit in response to light pulses emitted at certain previous times. For example the stored shapes of the plurality of waveforms stored in memory may relate to the signals received at the signal capture unit in response to light pulses emitted before the previous five minutes. The stored shapes of the plurality of waveforms stored in memory may relate to light pulses emitted before the previous hour. The stored shapes of the plurality of waveforms stored in memory may relate to light pulses emitted before the previous four hours.

At least a part of the signal processor may be formed as part of the signal capture unit. Alternatively, the signal processor may be wholly separate from the signal capture unit.

The apparatus is preferably arranged to convert the reflected light pulses into digital signals for processing by the signal processor. There may therefore be transducers for converting the light signals into electric signals. The signal capture unit may be arranged to receive output signals resulting from light reflected by objects in the plurality of rooms by means of receiving the light directly. In such a case, the signal capture unit may itself include one or more light transducers. The light transducers may convert the light signal into an electric signal. Alternatively, or additionally, one or more light transducers may be provided separately from the signal capture unit, for example in each room having an output node. In such a case, the output signals received by the signal capture unit may include electric signals converted by the light transducers from light reflected in a room. There may be a transducer that is arranged to generate electric signals from light signals reflected by objects in each of a plurality of different rooms. In such a case, the transducer may be arranged to receive a sequence of light waveforms, the successive light waveform each being associated with light reflections in a different room. One transducer can therefore be used to distinguish between light reflections in one room from those of another room. The or each transducer may be in the form of a photodiode.

The or each transducer is preferably able to convert a varying light signal (or waveform) into an electric signal (or waveform) having a resolution sufficient to enable detection of changes in light intensity of a duration of a nanosecond (more preferably, one-tenth of a nanosecond). The capture unit and/or signal processor preferably utilise a sampling period of between 10 and 1,000 picoseconds. A higher sampling rate will provide greater resolution of detection and allow detection of smaller amounts of movement within a room. Light travels about 3 mm in 10 picoseconds and about 30 cm in a nanosecond (=1,000 picoseconds). Preferably, the apparatus is arranged to enable detection of changes in light intensity of a duration of $2\times10^{-10}$ seconds (a sample rate of the order of 5 $GS^{-1}$—i.e., 5 Giga-samples per second=$5\times10^9$ samples per second). In such a case, the transducer required to provide such resolution of measurement may be relatively expensive, in which case having one transducer serving many nodes is particularly advantageous.

Each room may comprise one or more input nodes for collecting light reflected in the room. Conveniently, at least some of the plurality of waveguides are arranged for delivering light reflected by objects in the plurality of rooms, via one or more input nodes in each room, to the signal capture unit. At least some of the plurality of waveguides are arranged both to deliver light from the light source to one or more output nodes and to deliver reflected light from one or more input nodes. Thus, the same waveguide may be used both to deliver light and to receive reflected light. At least one input node may also perform the function of an output node. (As such references herein to an "output" node may, where the context so allows, equally apply to an "input" node and vice versa. Also, features described with reference to one of the three principal types of node, namely (a) an input node, (b) an output node, or (c) a node that performs both as an input node and an output node, may equally apply to a node of a different one of those three types.) There may be advantages in having more input nodes in a room than the number of output nodes in that room, for example in view of the way in which light may be reflected within the layout of a certain room. Each input node may be arranged to collect and/or detect light at a given region, but may not be configured to distinguish between the intensity or wavelength of the light at different positions within that region. In effect, each input node may be in the form of a single pixel node. Whilst, there may be many nodes arranged in a room a majority of the nodes are preferably spaced apart from each other.

The nodes may each be provided with an appropriate lens suited to ensure that the node covers the intended area of the room. A Fresnel lens may be used for example.

The number of output nodes preferably used per room will depend on various factors. It is believed that a relatively small-sized room, having a floor area of about 5 square meters for example, can be monitored by means of a single output node. There may therefore be a plurality of rooms in the building in each of which there are provided only one or two output nodes. There may be a plurality of rooms in the building in which there is provided only one output node. In other applications it may be desirable to have many output nodes each effectively monitoring a smaller area. Having more output nodes may increase cost and signal processing requirements and possibly (for example if a single capture unit and signal processing unit are used to monitor all reflected signals from such output nodes) the time taken for a scan of the rooms being monitored to be completed. Having more output nodes may however improve the accuracy and precision of identifying where in a room movement and/or occupancy is detected. There may therefore be at least one room, or a region in the building, in which there are provided more than five output nodes, and possibly more than ten output nodes. Having multiple nodes may also enable the apparatus to track movement, of for example a person, from one location in a building to another part location in the building (for example, tracking movement from one location within a room to another location within that room).

The light source may be a laser light source. The laser light source is preferably in the form of an Infra-Red laser unit.

Advantageously, one light source is arranged to deliver light to a multiplicity of output nodes. Thus, a single laser source with a sufficiently high specification to provide accuracy may serve many rooms thereby reducing the cost of the apparatus. The light source is preferably arranged to emit pulses each having a duration of between 0.1 and 200 nanoseconds. The light source is preferably arranged to emit pulses each having a duration of less than 100 nanoseconds. The light source may be arranged to emit pulses each having a duration of more than 1 nanosecond. It is preferred however to have light pulses each having a duration of less than 1 nanosecond. Light can travel about 30 cm in 1 nanosecond and can travel about 60 m in 200 nanoseconds. The received waveform (or waveforms, for example if there are two or more input nodes) will typically have a duration that is longer than the emitted pulse. Some objects in the room may be closer to the output/input node(s) such that the route from an output node, via object (and reflection) and back to an input node is significantly shorter than other routes. If the room has a maximum dimension of say 10 m then the difference in distance travelled by light along one path and another path could easily be 10 m or more. The received (reflected) light pulses may therefore have a duration that is at least 30 nanoseconds, and possibly more than 100 nanoseconds. Each pulse is preferably, but need not be, a square waveform pulse. Non square waveforms are possible. Preferably successive pulses emitted have substantially the same shape. Each pulse may comprise a burst of pulses or otherwise be modulated.

The waveguides are conveniently in the form of fibre optic cable.

As mentioned above, the apparatus is advantageously able to distinguish between a light pulse reflected by an object in a room delivered to that room via any one output node and a reflected light pulse originating from any other output node. This may be achieved in any suitable way. In the described embodiments, where the width (duration) of the light pulses is relatively low, the timing of the pulse is used to determine which node the pulse has been reflected from. Preferably, the apparatus introduces a time delay between the light delivered to one room and the light delivered to the next room. When using a single light source with many rooms, this may be achieved by emitting a single pulse, splitting that pulse for delivering to multiple different output nodes, and ensuring that the path length to each such output node differs sufficiently that the pulses are emitted from each output node with a delay between successive pulses at the time they are emitted. Thus, the reflected pulses are then advantageously separated from each other temporally, allowing the apparatus to determine the output node from which a reflected pulse originated. Conveniently, the waveguides that deliver the light to the output nodes differ in length sufficient to introduce such a time delay between the pulses by successive output nodes. It will be appreciated that a waveguide for delivering light from a light source to a distant room will necessarily have a minimum length that is longer than the minimum length required of a waveguide for delivering light to a room that is closer to the light source. As such, it may be convenient (but not necessary) to build in a longer time delay in relation to output nodes that are further away from the light source than the time delay in relation to output nodes that are closer to the light source. Alternatively, or additionally, different wavelengths of light could be used to distinguish between light sent to and reflected by certain rooms. Alternatively, or additionally, more light transducers could be provided per room.

The room occupancy sensing apparatus may be integrated with a system that detects operation of doors. For example, certain doors may require the use of an electronic key, swipe-card or the like thereby allowing detection of a human presence at the door. Such integration could reduce the number of false positives by means of discounting detected occupancy in a room that has been deemed empty for reason of the entry door to that room not having been operated within a suitable time period (for example since the start of the day concerned). The room occupancy sensing apparatus may be integrated with other monitoring systems in the building.

There may be one or more further buildings having rooms that are also monitored by the same room occupancy sensing apparatus.

The apparatus has particular application in relation to detecting expected occupation of rooms within a building during a period of time in which rooms may be occupied and then left unoccupied. An advantage of embodiments of the present invention is that there is an ability to detect when a room that has previously been occupied is left unoccupied. Movement detection systems of the prior art that are designed to monitor for unexpected movement in a room that is expected to be empty are merely required to detect movement in a room and then indicate as such, for example by setting off an alarm. Such intruder/burglar alarm systems are not sophisticated enough to detect non-occupancy of a room that has previously been occupied. However, with for example the ability to compare against the shape of a waveform stored from a previous time in which the room was known to be left unoccupied, the present invention provides embodiments in which non-occupancy of a room may be positively detected. Thus, the apparatus may be configured so that, during an uninterrupted state of actively monitoring the building, movement or occupancy in a room is detected, an indication that the room is occupied is made, and subsequently, when so deemed to be the case, an indication is made that the room is no longer occupied.

There is also provided, according to a second aspect, a room occupancy sensing apparatus for sensing the occupancy of one or more rooms, and preferably at least two rooms, in a building, the room occupancy sensing apparatus comprising (a) at least one light source arranged to emit a series of light pulses, (b) a plurality of waveguides, at least some of the waveguides being arranged to deliver light from the light source to a plurality of output nodes, which are each arranged for being located in a room, (c) at least one signal capture unit arranged to receive output signals, which in use (for example when the room occupancy sensing apparatus is installed and used in a building) result from light from the output nodes being reflected (for example by the scene within a room) and detected (for example via one or more input nodes), and (d) a signal processor. The apparatus is preferably arranged so as to be able to distinguish between a reflected light pulse resulting from light emitted by any one output node and a reflected light pulse resulting from light emitted by any other output node. The apparatus is preferably so arranged that, in use (for example when the room occupancy sensing apparatus is installed and used in a building), the signal processor compares the signal received at the signal capture unit in response to a first emitted light pulse with the signal received at the signal capture unit in response to a second emitted light pulse, whereby the apparatus is able in use both to detect movement in a room and to ascertain the particular room in which movement has occurred by virtue of (i) detecting a difference between signals received by the signal capture unit resulting from reflected light pulses from such first and second emitted light pulses and (ii) relating said reflected light pulses to the appropriate output node and therefore to the room associated with that output node. The room occupancy sensing apparatus of this second aspect of the invention may be provided as an installed system in a building, or may be provided separately in order to convert a building comprising a plurality of rooms into a building according to the first aspect of the present invention. As such, features of the first aspect of the present invention may be incorporated into this second aspect of the invention.

According to a third aspect, the present invention also provides a kit of parts for converting a building comprising a plurality of rooms into a building according to the first aspect of the present invention. The kit of parts may comprise at least one light source for emitting a series of light pulses. The kit of parts may comprise a plurality of waveguides. The kit of parts may comprise one or more output nodes. The kit of parts may comprise one or more input nodes. The kit of parts may comprise at least one signal capture unit. The kit of parts may comprise a signal processor. Features of the first aspect of the present invention may be incorporated into this third aspect of the invention.

The present invention also provides, according to a fourth aspect, a method of sensing room occupancy. The method may comprise using a room occupancy sensing apparatus according to the second aspect of the invention. The method may comprise a step of delivering a series of light pulses via a plurality of waveguides to one or more output nodes located in each of one or more rooms, preferably a plurality of rooms. The scene in each room may then reflect the light pulses emitted by the output nodes. The method may comprise a step of detecting the reflected light pulses. The method may comprise a step of monitoring for a difference between the detected waveform of a first reflected light pulse reflected from the pulse emitted from an output node and the detected waveform of a second reflected light pulse from the same output node, and performing such a monitoring step in respect of each of the output nodes. Detecting movement in a room may be achieved by means of detecting such a difference between detected waveforms. Detecting movement in a room is preferably achieved by means of comparing (a) the shape of the detected waveform of a first reflected light pulse reflected from the pulse emitted from an output node with (b) the shape of the detected waveform of a second reflected light pulse from the same output node. Movement in the room may thus be detected by means of detecting a difference between the shapes of the detected waveforms. The particular room in which movement, and therefore occupancy, is detected may be ascertained, preferably by means of determining the output node with which the difference so detected is associated. The method may comprise using a signal processor (for example an electronic signal processor, computer or the like) to ascertain the difference if any between the detected waveforms.

In contrast to some prior art systems, by measuring and comparing the shapes of waveforms the present method effectively measures and takes into account multiple measurements of transit-time per output node (or per instance of emission of light pulse in a room). In certain embodiments, depending on the resolution of measurement, measuring and comparing the shapes of waveforms may be considered as equivalent to a comparison in the digital domain of hundreds of separate measurements. This is because each beam spreads over a given area and hits different parts of the room or objects therein, with many different paths of light from output node back to input node. For each pulse, light of varying intensity (over time) is therefore received back at the input node(s).

There are preferably a plurality of output nodes. The series of light pulses may be emitted from the output nodes in a set sequence with a set time delay between the successive emissions. The set time delay may be the same as between a first pair of successive emissions (for a given beam for example) and a second pair of successive emissions (for the same beam for example). The set time delay may be different as between a first pair of successive emissions and a later pair of successive emissions (for example for the same beam). There may be such a time delay between every beam in a given space (such as a room). The provision of such time delays preferably allows for changes/movement to be detected on a per beam basis The step of monitoring for a difference between the shapes of the detected waveforms of the first and second reflected light pulses may be performed in respect of the shape of the waveforms resulting from light reflected from the pulse emitted from all of a plurality of output nodes. It may therefore be that only one shape comparison calculation is required in respect of all output nodes for a given set of emissions from the output nodes. It will be appreciated that the one shape comparison calculation may be conducted in respect of all output nodes for a given set of pulse emissions, the pulses being emitted at different relative times from the output nodes.

The method has particular, but not exclusive, application in relation to detecting room occupancy within a building having a plurality of rooms. In such a case, each room (to be monitored) will advantageously have at least one output node for that room. The method may include steps of delivering a series of light pulses via a plurality of waveguides to one or more output nodes located in each of the plurality of rooms, the scene in each room reflecting the light pulses emitted by the output nodes, and ascertaining the room or rooms corresponding to movement so detected. The method may be performed during a period of planned occupancy of at least one room being monitored.

The step of monitoring for a difference between the shapes of the detected waveforms of the first and second reflected light pulses may comprise performing a direct comparison between (a) the shape of the detected waveform of the first reflected light pulse and (b) the shape of the detected waveform of the second reflected light pulse.

The step of monitoring for a difference between the detected waveforms may be performed by means of a signal processor, for example defined by or forming part of a computer.

There may be a step of storing in the memory of an electronic data storage unit data concerning the shape of a multiplicity of detected waveforms, preferably including some waveforms detected more than a few minutes ago, and more than a hour ago.

It will of course be appreciated that features described in relation to one aspect of the present invention may be incorporated into other aspects of the present invention. For example, the method of the invention may incorporate any of the features described with reference to the apparatus of the invention and vice versa. The method for example may include use of the kit of parts. The kit of parts may for example be configured to be suitable for performing the method of the invention.

DESCRIPTION OF THE DRAWINGS

Embodiments of the present invention will now be described by way of example only with reference to the accompanying schematic drawings of which.

DETAILED DESCRIPTION

Figure 1A:
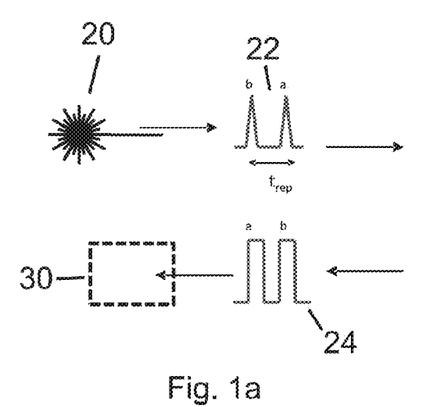
FIGS. 1a and 1b show an occupancy sensing system in accordance with a first embodiment of the present invention in an unoccupied room.
Figure 1B:
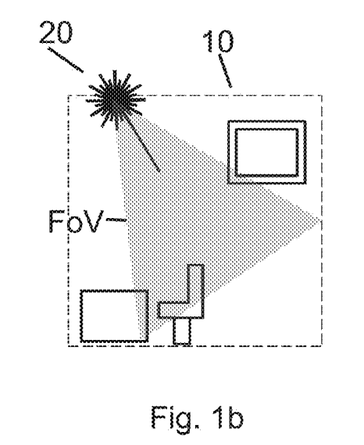
Figure 2A:
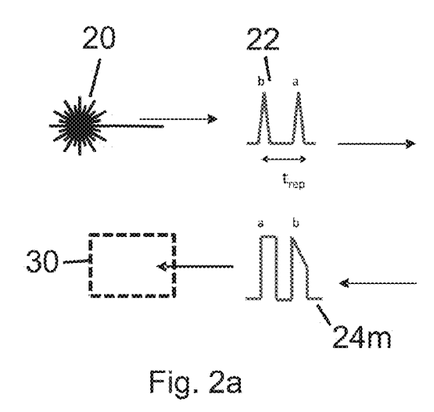
FIGS. 2a and 2b show the occupancy sensing system of the first embodiment in an occupied room.
Figure 2B:
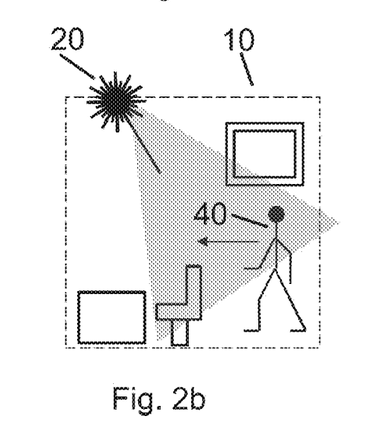

FIGS. 1a, 1b, 2a, and 2b illustrate schematically the principle of operation of an occupancy sensing system in accordance with a first embodiment of the present invention. FIGS. 1a and 1b show the system working with an unoccupied room 10. The system shown comprises a pulsed laser unit 20 which emits identical pulses 22 (labelled individually as pulse "a" and pulse "b") of laser light separated by a specified time, $t_{rep}$. The pulses 22 emitted by the laser unit 20 are reflected by the physical surfaces in the scene within the sensor Field of View (FoV). The reflected pulses 24 are detected and stored by a capture unit 30 as digital waveforms. If no change (i.e. motion) occurs between the reflections of two sequential pulses, their reflected waveforms 24 will be identical, as shown in FIG. 1a. FIGS. 2a and 2b show the system of FIGS. 1a and 1b in operation when the room 10 is occupied by a moving person 40. As shown in FIGS. 2a and 2b, the motion that occurs in the sensor FoV during the time between the reflections of two sequential pulses ("a" and "b"), as a result of the person 40 entering the FoV, changes the physical layout of the scene between the first pulse and the second pulse. The laser pulses are therefore reflected differently, the second pulse for example being reflected so that at least part of the light travels along a path of different length, resulting in some light taking a different length of time before being detected (in comparison to the first pulse). This results in temporal differences between the waveforms of the reflected pulses 24m, as shown in FIG. 2a. The capture unit 30 detects that the shape of the waveform of the second pulse (pulse "b") of the two pulses 24m is different from the first, thereby detecting the motion in the room, and therefore detecting that the room is occupied. The system is a non-imaging system and instead uses temporal (time-based) characteristics of light pulses as the means of occupancy detection (for example, analysing and/or comparing waveforms in the time-domain).

Figure 3:
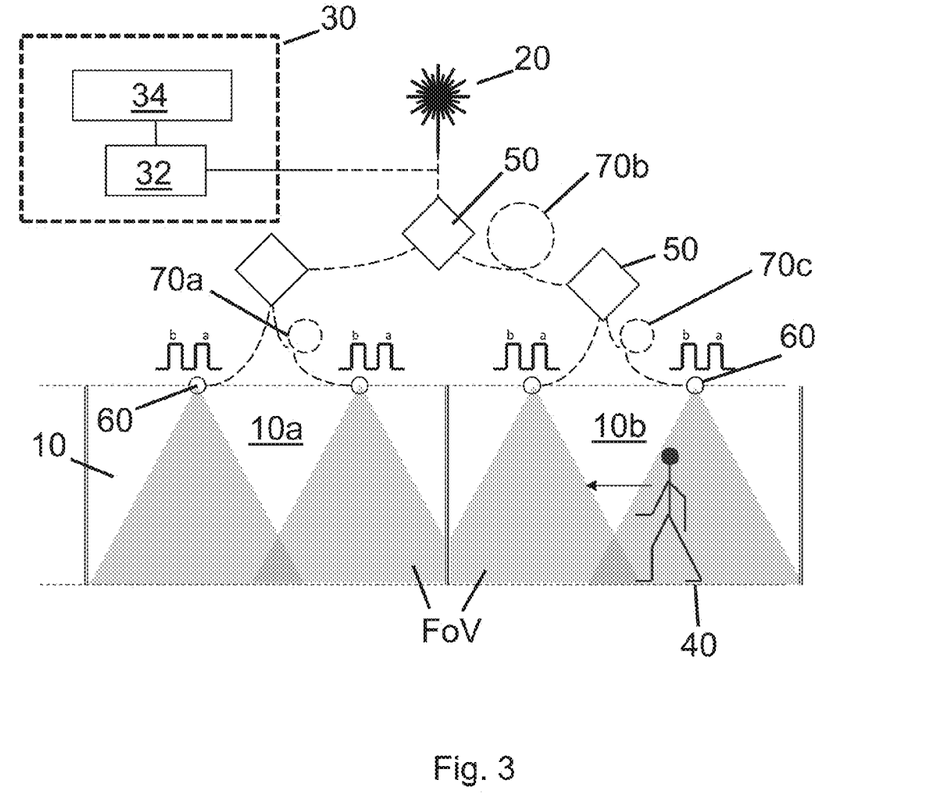
FIG. 3 shows the occupancy sensing system of the first embodiment in use in two adjacent rooms.

The first embodiment is shown in further detail in FIG. 3, which shows the occupancy sensing system installed in a building, which in this first embodiment is in the form of an office building having multiple rooms 10 any of which could be occupied. Two such rooms 10a, 10b are shown in FIG. 3. The occupancy sensing system is arranged to detect which of many rooms 10 are occupied, for example by one or more employees, at any given time. Such a function may be of particular use, for example in quickly assessing which of many rooms in a building are occupied in the case of an emergency, such as a fire. It may otherwise be difficult to determine whether one or more rooms have been successfully evacuated, particular if there are many rooms in the building, if there are rooms that are remotely located, and/or if access to any given room is restricted.

With reference to FIG. 3, a single pulse laser unit 20 generates successive pulses of laser light, with a period of $t_{rep}$ that are split by splitters 50 into multiple light paths (defined by fibre optic cable), each light path being associated with a respective pulse of light. The pulses are carried by fibre optic cable to multiple output nodes 60. An output node is formed at the end of the fibre optic cable in the room to be monitored and is associated with a suitable lens in order to provide an adequate field of view (although it would be possible for an output node to be defined by the open end of the bare fibre, which would in any case provide a relatively wide field of view). The fan-out structure of the fibre optic cable network illustrated in FIG. 3, particularly the arrangement of signal splitters 50 between the source 20 and each output node 60, allows each node 60 to output approximately the same pulse power, meaning that any required amplification of the pulse waveforms for analysis can be substantially uniform. Return reflections are carried back to the capture unit 30, which includes both a transducer, in the form of detector 32, and a control unit 34. The control unit 34 includes a computer processor. The detector 32 receives and detects the reflected pulses and converts the received pulses into electrical digital waveforms. The control unit controls the operation of the system and also processes the digital pulse waveforms.

The pulses 22 from each output node 60 are emitted at the point of the node at different times, separated by a delay Δt. The delay Δt between the time at which one pulse is emitted from one node and the time at which the same pulse is emitted from the next node is introduced by a delay loop 70 in the relevant fibre optic cable. This may be achieved in practice by using fibre optic cables of varying lengths as delay lines—the longer the cable, the longer the time taken for a pulse to be emitted from the output node, reflected and received by the detector. The length of the fibres is therefore incremented cumulatively for each node by a length equivalent to the required interval.

In FIG. 3 it will be seen that the route to the leftmost node in the Figure, has no delay loops. The fibre optic cable route to the next node (second from the left) has a delay loop 70a that adds a delay of $\Delta t$. The fibre optic cable route to the next pair of nodes (the two nodes on the right) includes a larger delay loop 70b that adds a delay of $2\Delta t$ to the routes to both nodes. The route to the node on the far right also includes a further delay loop 70c that adds a delay of $\Delta t$. Thus, during operation, a laser pulse is emitted by the source 20 and is then split into four laser pulses by the splitters 50, which arrive at the nodes at times To (far left node), $T_0+\Delta t$, $T_0+2\Delta t$, and $T_0+3\Delta t$, respectively. The reflected pulses travel back from the nodes 60 to the capture unit 30 along the same route as taken by the pulse from the laser source 20 to each such node 60. The same node 60 is used both as output and input of laser light to and from the room. Thus a further delay is added so that the laser pulse that is delivered to each node 60 is reflected in the room and received back at the capture unit 30 at different times, separated by an interval of at least $2\Delta t$.

The length of the pulses is chosen to be sufficiently short (relative to the delay $\Delta t$) and the separation between successive pulses emitted by the laser source 20 is chosen to be sufficiently long (longer than the time between the instant at which the pulse is emitted and last reflected pulse is received at the capture unit) to ensure that the pulses received at the capture unit, originating from different nodes, do not overlap or interfere with each other and can be readily distinguished by the capture unit. Thus, for a system having n nodes, a single pulse emitted by the laser source is split into n pulses and emitted by the n nodes. The capture unit receives a sequence of n reflected pulses resulting from that single pulse emitted by the laser source, before the laser source emits the next pulse (consider also the explanation provided below with reference to FIGS. 4a to 4d of the second embodiment).

The reflected pulses are captured, digitised, stored and processed by the capture unit. The node from which the reflected pulse is received is identified by means of the time at which the pulse is received. The digital waveforms from successive reflected pulses from the same node are compared by the computer processor of the control unit 34 (in the capture unit 30). In this embodiment, a Binary Two's Complement method is used to compare the pulse waveforms. This is equivalent to inverting one of the waveforms and adding the two resulting waveforms. Regardless of their shape, if the waveforms are identical, a null output will occur. However, if the two waveforms differ due to motion occurring during the time between the pulse reflections, a non-zero output will be apparent, and if it exceeds this tolerance, this will indicate occupancy. The room in which occupancy has been detected can be determined by relating the input/output node from which the reflected pulse was received to the room it is associated with.

In the present embodiment, the time $t_{rep}$ is about one second, equating to a pulse repetition rate (at the laser source) of about 1 Hz. A faster rate could be used, but 1 Hz allows for detection of motion of typical speed in the workplace. The rate may be calibrated according to the type of application/installation. The present embodiment is used in relation to rooms having a height of 5 m, where the nodes are ceiling mounted. The average pulse from each node travels a 10 m return journey from the node, via reflection in the room and back to the node. The light travels at $3 \times 10^8$ ms$^{-1}$. A 10 m journey by the light thus takes about 33 nanoseconds. The width of the pulse emitted from the laser source is about 1 nanosecond (i.e. about 30 cm). The width of the pulse will spread as a result of different reflections in the room and as a result of dispersion and other pulse-spreading effects as the light travels along the fibre optic cable. The capture unit therefore operates using a pulse sampling interval of about 100 nanoseconds, resulting in 100 nanoseconds worth of data being stored per pulse per node. Each 100 nanoseconds worth of data includes 1,000 data points, requiring a sampling frequency of 10 GSs$^{-1}$. The resolution of movement that can be detected with such a system is thus of the order of 3 cm. Given that each pulse requires of the order of 100 nanoseconds of sampling at the capture unit, the system of this embodiment (operating at a pulse repetition rate of 1 s) could use as many as $10^6$ (and possibly up to almost $10^7$—i.e. 1 second cycle time divided by 100 nanoseconds pulse sampling interval time) pulse output nodes without any overlap in successive pulses.

Figure 4A:
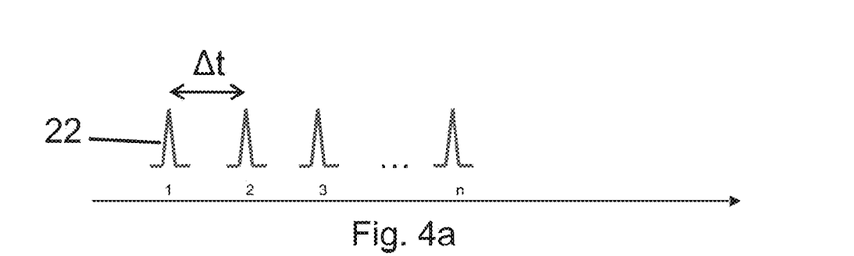
FIGS. 4a to 4d show the steps of emitting and receiving light pulses as used in a second embodiment of the invention.
Figure 4B:
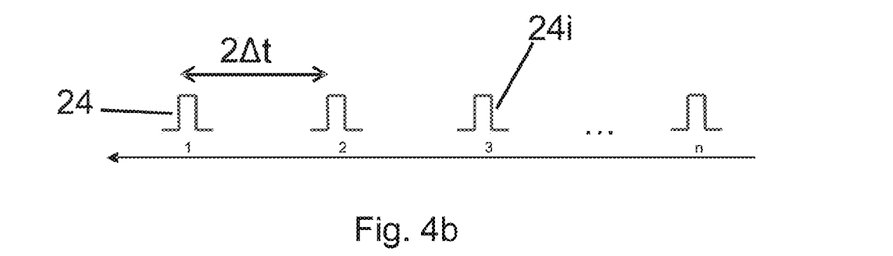

The system of the first embodiment can be readily scaled up by adding more splitters and delay loops. By way of illustration, FIGS. 4a to 4d and 5 illustrate a second embodiment of the invention installed in a building for monitoring a larger number of nodes. FIGS. 4a to 4d show the steps of emitting and receiving pulses. In this embodiment, there is one node per room. Initially (FIG. 4a) the laser source emits a single pulse, which by means of the delay loops, generates successive pulses at the respective output nodes. The successive pulses are separated by a time delay of $\Delta t$. FIG. 4a shows the first three pulses and the last ($n_{th}$) pulse only. Each pulse is emitted from an end of the fibre optic cable which is positioned and configured in each room to provide an adequate field of view. The pulse is then reflected in the room, a part of the reflection being detected via the same end of the fibre optic cable (so that the output node in each room also performs the function of the input node). Consequently (with reference to FIG. 4b) as the reflected pulses 24 travel back via the fibre optic cable network, extra delays are introduced so that the received pulses are separated by time $2\Delta t$. The reflected pulses 24 each have a modified waveform (compared to the emitted pulses) that depends in part on the physical layout of the room and the way in which the emitted pulse is reflected in the room and back to the input/output node. Each respective reflected pulse 24 may therefore have a shape that is particular to the layout and shape of the room and its contents (of field of view) at a given time. The reflected pulses 24 will therefore almost certainly have different waveform shapes.

Figure 4C:
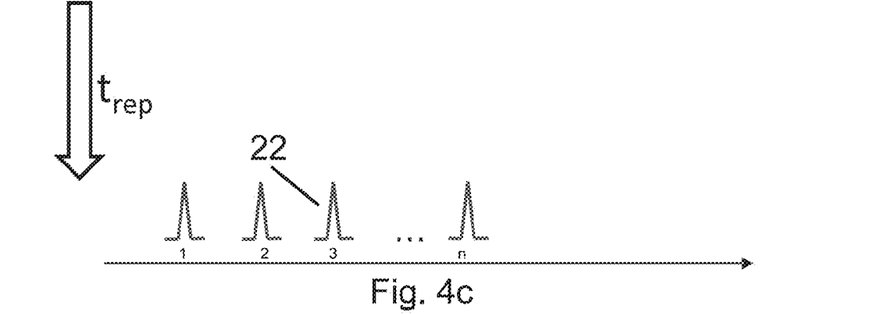
Figure 4D:
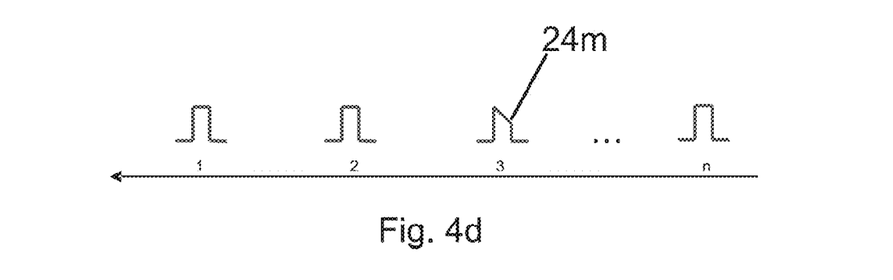

After a time $t_{rep}$ the next pulse is emitted by the laser source (as shown schematically in FIG. 4c). In this case, there has been a movement in room number 3 and no movement in any of the other rooms. As such this latter reflected waveform 24m (see FIG. 4d) from the third node has a different shape from the immediately preceding reflected waveform 24i (see FIG. 4b) from the third node. The capture unit compares successive reflected pulses from each node for changes sufficiently large to signify movement in the room. Thus, in this example, the capture unit detects a change in the shape of the third node's reflected pulses and deems the associated room to be occupied.

Figure 5:
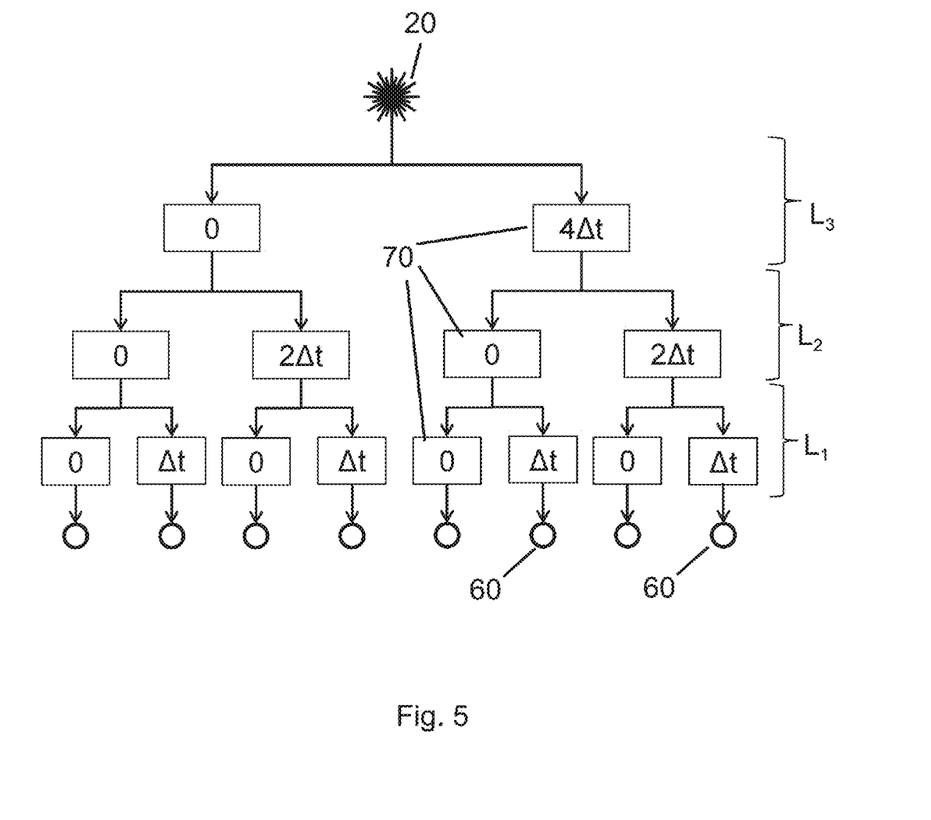
FIG. 5 shows the arrangement of the network of nodes provided for emitting and receiving light pulses in the second embodiment.

FIG. 5 shows how the fibre optic cable network can be expanded to allow for many output/input nodes for each laser source/capture unit. FIG. 5 shows a network for 8 nodes. The network has 3 levels, L1, L2, L3 (which in FIG.

5 are labelled such that the level closest to the nodes is labelled L1). At each level, the number of pulses is doubled by means of optical splitter units dividing each pulse received by that unit into two pulses. Delay loops are then inserted to provide different delay times for each respective pulse as outputted at a node. The delay loops could of course be inserted differently, but for an efficient use of optical cable, longer delay loops are inserted closer to the source. Thus, in FIG. 5, at the topmost level, L3, the single pulse from the laser light source 20 is split into two pulses, one passing down a left-hand branch to which no delay is added and one down a right-hand branch to which a delay of 4Δt is added. The two pulses then pass to the next level at which each pulse is split into two pulses, one having no delay added and one having a delay of 2Δt added. The process is repeated again at the lowest level, L1, with the split pulses having either no delay or a delay of Δt added. As a result, the pulses arriving at the nodes 60 have successive delays (from left to right) of 0, Δt, 2Δt, 3Δt 7Δt. If more than 8 nodes are required another level is added above level L3 in a similar pattern. Thus, for n nodes, there needs to be/levels, where/is equal to (log n)/(log 2), rounded up. The delay to be inserted at the $i_{th}$ level will be equal to $2^{i-1}$ (2 to the power of i−1) Δt. It will also be appreciated that 2 n Δt will ideally be relatively low compared to $t_{rep}$, so that all reflected pulses generated by a first pulse emitted from the laser source are received before the reflected pulses generated by the next pulse emitted from the laser source start to arrive.

The physical length of the delay loops introduced into the fibre optic cable network should be determined taking into account the length and refractive index of the fibre optic cable from the laser source to the nodes. Thus, the physical separation of rooms, and differing distances of the rooms from the location of the laser source may introduce part of the delay required for each node. For this reason, it may be more efficient and convenient if the nodes that are closest to the laser source are connected by fibre optic cables having less in the way of cable added to introduce delay loops, whereas the nodes that are further away have the longer delays.

It will be seen that the scalable system illustrated by the first and second embodiments enable occupancy sensing of large areas at relatively low cost, because the system design proposed consists of a smaller number of lasers than there are sensing areas (e.g. a single pulsed laser) and a network of pulse output nodes connected by optical fibres. These are emitted from the laser unit and will travel along the optical fibres to be emitted by each pulse output node. The pulses are reflected and received by a smaller number of detectors than sensing areas, (e.g. a single detector and capture unit).

The number of units required to provide full coverage of the area or areas of interest will depend on the Field of View (FoV) of each pulse output unit. Sensor FoV may be adjusted to the required width using optical lenses on each pulse unit. Maximum coverage using the minimum number of laser nodes and computers may be achieved by increasing sensor FoV. Conversely, using a greater number of laser nodes with a narrow FoV may enable the system to be used as a high-resolution motion location and therefore tracking system.

Figure 6:
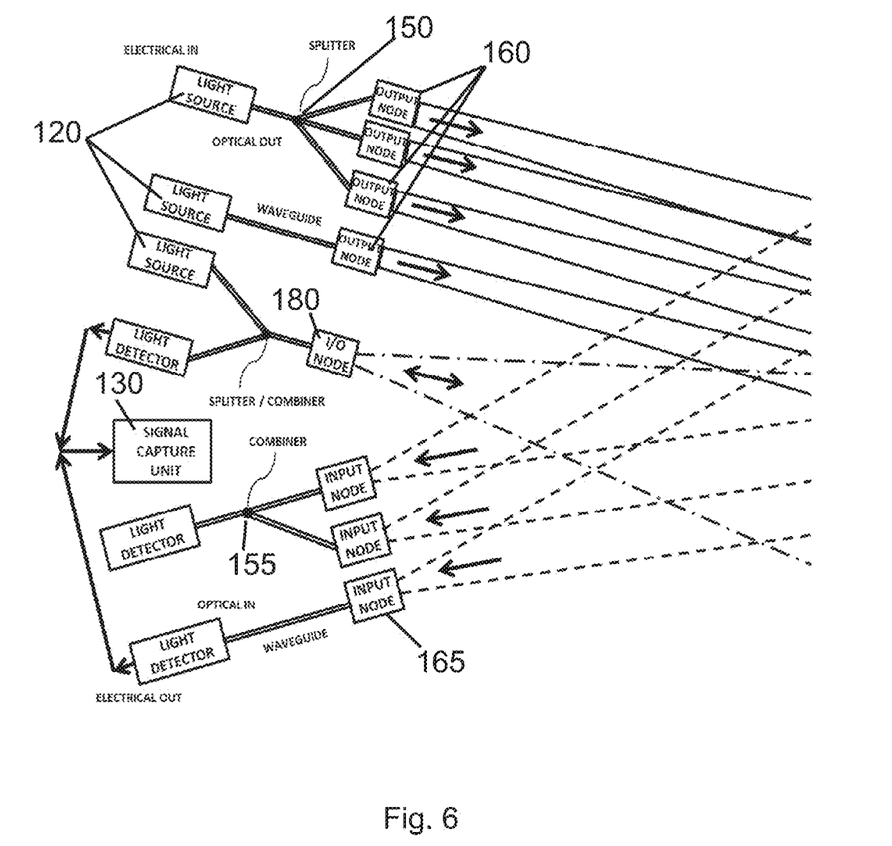
FIG. 6 shows an occupancy sensing system in accordance with a third embodiment of the present invention.

FIG. 6 illustrates schematically an occupancy sensing system in accordance with a third embodiment of the present invention, showing part of the system only in relation to a single room. The system has many independently operable pulsed laser units 120 each of which emits identical pulses of laser light, in turn. The light pulses are split by splitters 150 and outputted from output nodes 160. Some laser units supply more output nodes than others. The path length between the laser unit and the output node is set by the length of the path of the one or more waveguides, which may include one or more delay loops, between the laser unit and the output node. The laser units are controlled by a central control unit such that pulses of laser light are emitted in sequence from the output nodes, the start of the pulse emitted from one output node to the next being predetermined by the control unit and the path length between the laser unit and the output node, and being a pre-set parameter of the system. There is a delay between triggering the laser unit and the laser unit emitting a light pulse, but this delay can be assumed to be approximately the same for all laser pulses, and therefore does not need to be accounted for. Return reflections are carried back to a capture unit 130 via input nodes 165 and associated waveguides, and optionally combiners 155. In FIG. 6, only one node 180 is illustrated as acting as both an input node and an output node. The return reflected waveforms are analysed in a similar manner as that described with reference to the first embodiment. Some nodes are shared and thus in this embodiment it may not be possibly for the apparatus to detect (or "know") the exact path taken by light that is received at the capture unit 130. However, the apparatus is able to distinguish between light received from a node or nodes in one room from light received from nodes in other rooms. The system of the present embodiment is also, like the other illustrated embodiments, able to cope with a situation in which, inadvertently, a detector in a room can 'see' stray radiation from a light source (output node), other than the one to which it is matched. Consider, for example, a scene which contains a computer monitor with a glossy screen. A first output node may illuminate part of the scene which contains the monitor, and whilst a first input node may receive most of the signal, some stray radiation may accidently be reflected off the glossy screen into another input node, which is in the same room. Despite this, the embodiment still functions correctly, since the same amount of stray radiation would be found as between successive pulses (assuming no other changes in the scene): it is successive pulses that are compared, and so the system is, in effect, constantly recalibrating itself.

Figure 7A:
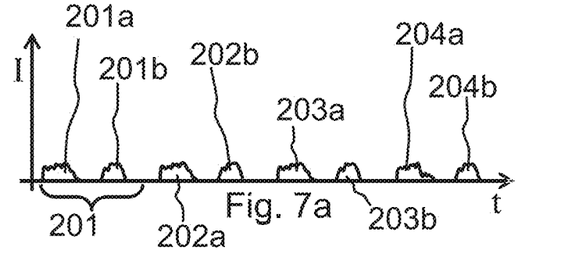
FIGS. 7a to 7d show measurements made with an occupancy sensing system in accordance with a fourth embodiment of the present invention.
Figure 7B:
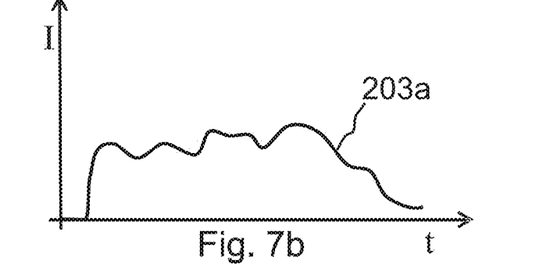
Figure 7C:
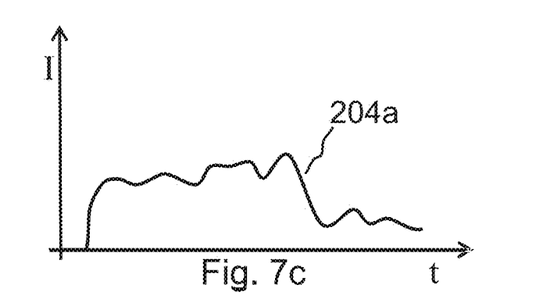
Figure 7D:
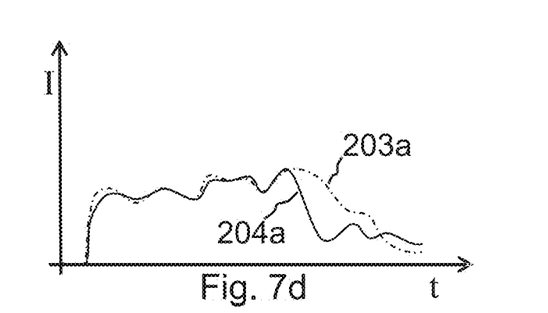

A fourth embodiment of the invention provides for a more sophisticated analysis of the differences between shapes of waveforms. A source of pulsed laser light is outputted via a signal splitter to two output nodes which together are able to monitor occupancy in a single room. One output node is fed via a delay loop so that a single pulse is converted into two time-separated emitted pulses. Return reflections are carried back to a capture unit via two input nodes (which in this embodiment are the same as the output nodes) combined and received at a single capture unit where the shapes of the received signal waveforms are analysed by a signal processing unit. FIG. 7*a* is a graph showing the shapes of reflected signal waveforms received at the capture unit as a measure of intensity, I, over time, t. FIG. 7*a* shows a sequence of four received waveforms, 201*a*, 201*b*, 202*a*, 202*b*, 203*a*, 203*b*, 204*a*, 204*b*. Each waveform comprises two distinguishable reflected pulses, such that for example the first waveform 201 shown at the left side of the graph has two time-separated and distinct waveform shapes 201*a* and 201*b*. It will be appreciated that the two waveform shapes 201*a* and 201*b* are time separated as a result of the emitted pulses from the output nodes being so time-separated, and the return path from one of the input nodes including a time delay, resulting in the received waveform having two waveform shapes pulses also being time-separated. The waveform shapes 201*a*, 202*a*, 203*a* and 204*a* from the first input node are interleaved with the waveform shapes 201b, 202b, 203b and 204b from the second input node. In this case, all of four waveform shapes 201b, 202b, 203b and 204b from the second input node are substantially identically shaped. The first three waveform shapes 201a, 202a, and 203a from the first input node are substantially identically shaped, but the fourth waveform shapes 204a has a different shape. FIG. 7b shows the third waveform shape 203a from the first input node whereas FIG. 7c shows the fourth waveform shape 204a from the first input node. FIG. 7d shows the fourth waveform shape 204a from the first input node, with the third waveform shape 203a time-shifted and overlaid (shown in broken line) to better illustrate the differences in the shapes of the two waveform shapes.

The signal processing unit detects that the two waveform shapes 203a, 204a shown in FIG. 7d are different and therefore indicates that there has been movement of something within the region monitored by the first node (and not the second node) in the room. The signal processing unit also ascertains that the differences between the two waveforms are only towards the end of the waveform indicating that the movement results from an object in the monitored scene positioned so that the path of the reflected light is relatively long, such as for example something close to the floor (in the case where the input/output node is ceiling mounted). The signal processing unit stores a history of received waveform shapes so that the received reflected waveform can be compared not only with the immediately preceding received reflected waveform, but also earlier received reflected waveforms, from both a few minutes ago, a few hours ago and the earliest waveform before which movement/occupancy was last detected. Slow changing differences in the shape of the waveforms can also thus be monitored and analysed.

The fourth embodiment in common with other embodiments of the invention provides a room occupancy sensing system which is arranged to discount (i.e. note as irrelevant) changes in the shape of waveforms that have resulted from static items that have previously been moved within the room. Once a person leaves a room, and such an event is determined by the system, the state of the scene in the room can be assumed to be fixed (until there is occupancy in the room again). The shape of the waveform may differ from that previously ascertained the previous time the room was left unoccupied (because objects in the room have changed position—for example, a chair has been left in a different position), but the system is able to cope with such changes by comparing the shape of the waveform measured with the shape of the waveform ascertained immediately after the room is left unoccupied.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The apparatus may be arranged so as to account for changes in background radiation. If a person in a room turns a light on or off in a room, or otherwise changes the lighting, there may be changes in the shape or magnitude of the waveform of light detected by the room occupancy sensing apparatus. However, in the case where the apparatus is a room occupancy sensing apparatus and not a motion detection system such changes would correctly indicate occupancy of the room. Changes in background light conditions in a room not caused by a person occupying the room may be discounted by the room occupancy sensing apparatus. For example, all lighting in the building may be controlled by a system that integrates with the room occupancy sensing apparatus. In such a case, energy savings may be made by means of the system turning off lights in rooms that are deemed empty. The apparatus may be able to discount changes in outside lighting conditions, if such conditions affect the light conditions in the room, by methods that will be readily apparent to the skilled person.

There may be more than one output node per room. The beams of light from each such output node may be less divergent than illustrated, so that relatively small areas are monitored by each beam. Such an approach may add to cost and/or complication, but provides a means of precisely locating movement/occupancy. The circuit and fibre optic cables for detecting and analysing reflections in the rooms may be separate from the circuit for causing pulses of light to be emitted in each room. Whilst having identical laser pulses (emitted from different output nodes) is desirable, this is not essential. More than one laser could be provided. The laser light is split in two at each level of signal splitting. The laser light could however be split into more separate pulses at each level of signal splitting.

The pulse sample interval and rates could be changed to improve resolution or to reduce resolution, but perhaps reduce the cost of the components required for the system.

Analogue signal processing techniques (optionally including analogue computing methods) may be used to compare the shapes of waveforms.

The analysis of the shapes of the waveforms may involve yet further more sophisticated analysis. Different types of movement/occupancy/change of the environment/scene being monitored can be differentiated on the basis of analysing how the shape of the received waveforms change over time. For example, it would be possible to teach or otherwise programme the signal processing unit to detect for smoke in the room. Smoke may be detected by means of changes, typically of a slowly evolving character, in the shapes of successive waveforms. The introduction of smoke in the room will result in increasing dispersion, back-scatter and attenuation of light beams, all having impact on the shape of the resulting detected waveforms. When the input and output nodes are mounted in the ceiling of a room, smoke that lies close to the floor will result in changes to the shape of the waveform at certain region(s) in the shape (as a result of the longer path length of the light). It is also believed that the apparatus when suitably programmed will be able to distinguish between movement caused by small fast moving objects in the room, on the one hand, and movement caused by human occupancy, on the other hand. A desk-mounted fan with fast-moving fan blades can for example be distinguished from a relatively slow moving person, by means of issuing a short burst of pulsed light emissions at a much higher frequency than 1 Hz (say around 1 kHz). Such high frequency pulses can detect the periodic and regular changes in the waveform shapes attributable to the fan and then discount such changes as resulting from non-human occupancy. It is also thought that the presence of live pests (for example rodents) will be able to be detected and distinguished from other types of movement in the room. Rodents, for example, will tend to move along and close to the floor and will result in changes to the detected waveform of a certain type.

The received waveforms may be collected and averaged (for example as a rolling average of several successive waveforms) before being compared to a reference waveform shape. Summing and/or averaging multiple waveforms before the comparison step can reduce the effect of measurement noise, or other noise in the system.

The system may be able to detect inactivity of a person in a room. If the room is occupied by a person and he/she then collapses, for example falling to the ground, the system may be able to detect such an event and issue an appropriate alarm. The system may be able to detect that the scene in the room has remain unchanged for a given period of time (indicating substantially no movement whatsoever in the room) and may also be able to compare the shape of the waveform of the room with a previous shape (measured when the room was left unoccupied) and be able to attribute the differences in the shapes to there being a person-sized object on the floor. The system may then raise the alarm that there is a risk that the room is occupied by a person who has collapsed.

In the case where a building is being evacuated, the apparatus may increase the frequency at which pulses are emitted, so as to increase the resolution of measurement, and therefore the confidence in the system's measurements and conclusions as to which parts of a building are occupied and which parts of a building are unoccupied The monitoring for changes in the shape of the waveform for successive measured signal waveforms does not need to involve a direct comparison of two waveforms. It may be possible to compare the shapes of waveforms and/or detect a difference in the shapes of two waveforms by comparing characteristics of the shape of the waveforms. For example there may be applications in which the waveforms are transformed by means of a Fourier transformation and it is the Fourier transformations which are compared directly.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of sensing occupancy in a room, wherein the method comprises the following steps:
    delivering a series of light pulses via one or more waveguides to one or more output nodes located in the room, the scene in the room reflecting the light pulses emitted by the one or more output nodes to give for each emitted light pulse a reflected light pulse,
    detecting each reflected light pulses as a waveform,
    monitoring for a difference between (a) the shape of the detected waveform of a first reflected light pulse reflected from the pulse emitted from an output node and (b) the shape of the detected waveform of a second reflected light pulse from the same output node, and performing such a monitoring step in respect of each of the output nodes, and
    detecting movement in the room by means of detecting such a difference between the shapes of the detected waveforms from a same output node.

2. A method according to claim 1, wherein there are a plurality of output nodes and the series of light pulses are emitted from the output nodes in a set sequence with a set time delay between the successive emissions.

3. A method according to claim 2, wherein the step of monitoring for a difference between the shapes of the detected waveforms of the first and second reflected light pulses is performed in respect of the shape of the waveforms resulting from light reflected from the pulse emitted from all output nodes.

4. A method according to claim 1, wherein the method is performed to detect room occupancy within a building having a plurality of rooms, each room having at least one output node.

5. A method according to claim 4, wherein the method includes
    delivering a series of light pulses via a plurality of waveguides to one or more output nodes located in each of the plurality of rooms,
    the scene in each room reflecting the light pulses emitted by the output nodes, and
    ascertaining the room or rooms corresponding to movement so detected.

6. A method according to claim 4, wherein the method is performed during a period of planned occupancy of at least one room being monitored.

7. A method according to claim 1, wherein the step of monitoring for a difference between the shapes of the detected waveforms of the first and second reflected light pulses comprises performing a direct comparison between (a) the shape of the detected waveform of the first reflected light pulse and (b) the shape of the detected waveform of the second reflected light pulse.

8. A method according to claim 1, wherein the step of monitoring for a difference between the detected waveforms is performed by means of a signal processor.

9. A method according to claim 1, further including a step of storing in the memory of an electronic data storage unit data concerning the shape of a multiplicity of detected waveforms.

10. A room occupancy sensing apparatus comprising:
    at least one light source for emitting a series of light pulses,
    two or more output nodes for locating in each of a plurality of rooms,
    a plurality of waveguides for delivering light from the light source to the two or more output nodes,
    at least one signal capture unit arranged to receive output signals resulting from light reflected by objects in the plurality of rooms, and
    a signal processor,
    wherein
    the apparatus is arranged so as to be able to distinguish between output signals resulting from a light pulse delivered to an output node associated with a room and reflected by an object in the room, and output signals resulting from a light pulse delivered to any output node associated with any different room and reflected by an object in that different room, and
    the signal processor configured to compare the shape of the waveform of a signal received at the at least one signal capture unit in response to a first light pulse emitted by an output node with the shape of the waveform of a signal received at the at least one signal capture unit in response to a second light pulse emitted by that output node,
    whereby the apparatus is able both to detect movement in a room and to ascertain the particular room in which movement has occurred by virtue of (i) detecting a difference between the shapes of the waveforms of the signals received by the at least one signal capture unit resulting from reflected light pulses from such first and second light pulses emitted by a same output node and (ii) relating said reflected light pulses to the room concerned.

11. An apparatus according to claim 10, further comprising one or more transducers for converting varying light signals reflected by objects in the rooms into electric signals having a resolution sufficient to enable detection of changes in light intensity of a duration of a nanosecond.

12. An apparatus according to claim 10, wherein at least some of the plurality of waveguides are arranged for both delivering light reflected by objects in the plurality of rooms, via one or more input nodes in each room, to the signal capture unit and for delivering light from the light source to one or more of the two or more output nodes.

13. An apparatus according to claim 12, wherein at least one input node also performs the function of an output node.

14. An apparatus according to claim 10, wherein the apparatus is configured, during an uninterrupted state of actively monitoring the plurality of rooms, to detect movement or occupancy in a room,
to indicate that the room is so occupied,
to deem subsequently that the room is no longer occupied, and
to indicate that the room is no longer occupied.

15. An apparatus according to claim 10, further comprising two or more input nodes for locating in each of the plurality of rooms for receiving light reflected by objects in the plurality of rooms and delivering signals to the at least one signal capture unit via at least some of the plurality of waveguides.

16. An apparatus according to claim 15, wherein the two or more input nodes are provided by the two or more output nodes, respectively.

17. An apparatus according to claim 10, wherein the series of light pulses are emitted from the two or more output nodes in a set sequence with a set time delay between successive emissions.

18. An apparatus according to claim 10, further comprising a storage unit configured to store data concerning at least one received waveform shape in relation to a room or output node, and wherein the signal processor is configured to compare the shape of the waveform of a signal received at the at least one signal capture unit for a room or output node with the shape of at least one such stored waveform for that room or output node.

19. An apparatus according to claim 10, wherein the signal processor is configured to, on detecting a difference between the shapes of the waveforms of the signals received by the at least one signal capture unit resulting from reflected light pulses from the first and second light pulses emitted by the same output node, ascertain where in the waveform the difference is located.

20. A building comprising the apparatus according to claim 10.

* * * * *